United States Patent
Selmeczy et al.

(10) Patent No.: US 9,296,911 B2
(45) Date of Patent: Mar. 29, 2016

(54) THERMAL INK JET INK COMPOSITION

(71) Applicant: VIDEOJET TECHNOLOGIES INC., Wood Dale, IL (US)

(72) Inventors: Anthony Selmeczy, Roselle, IL (US); Kyle Harvey, Elk Grove Village, IL (US); Casey Robertson, Romeoville, IL (US); Linfang Zhu, Woodridge, IL (US)

(73) Assignee: Videojet Technologies Inc., Wood Dale, IL (US)

( * ) Notice: Subject to any disclaimer, the term of this patent is extended or adjusted under 35 U.S.C. 154(b) by 0 days.

(21) Appl. No.: 14/580,915

(22) Filed: Dec. 23, 2014

(65) Prior Publication Data

US 2015/0109390 A1    Apr. 23, 2015

Related U.S. Application Data

(63) Continuation-in-part of application No. 13/496,531, filed as application No. PCT/US2010/050655 on Sep. 29, 2010, now Pat. No. 8,920,552, which is a continuation of application No. 61/247,316, filed on Sep. 30, 2009.

(51) Int. Cl.
*C09D 11/36* (2014.01)
*C09D 11/38* (2014.01)
*C09D 11/328* (2014.01)

(52) U.S. Cl.
CPC ............. *C09D 11/38* (2013.01); *C09D 11/328* (2013.01); *C09D 11/36* (2013.01)

(58) Field of Classification Search
CPC ....... C09D 11/30; C09D 11/328; C09D 11/38
See application file for complete search history.

(56) References Cited

U.S. PATENT DOCUMENTS

| | | | | |
|---|---|---|---|---|
| 5,755,860 A | * | 5/1998 | Zhu | ......... C09D 11/50 106/31.05 |
| 8,075,121 B2 | | 12/2011 | Barreto | |
| 8,087,766 B2 | | 1/2012 | Barreto | |
| 2011/0012954 A1 | | 1/2011 | Brown | |
| 2012/0013677 A1 | * | 1/2012 | Robertson | ............. C09D 11/38 347/20 |
| 2012/0147087 A1 | * | 6/2012 | Robertson | ............. C09D 11/30 347/20 |
| 2013/0327247 A1 | | 12/2013 | Khavari | |
| 2014/0137766 A1 | | 5/2014 | Chaffins | |

* cited by examiner

*Primary Examiner* — Veronica F Faison
(74) *Attorney, Agent, or Firm* — Joseph A. Yosick

(57) ABSTRACT

A thermal ink jet ink composition include a volatile organic solvent, a binder resin, a dye, a humectant in an amount from 1% to 40% by weight of the ink composition, and an additive for extending the decap time. The additive is present in an amount greater than 0.01% by weight of the thermal ink jet ink composition. The additive is selected from fluorinated surfactants, ionic surfactants, and nonionic surfactants.

22 Claims, No Drawings

THERMAL INK JET INK COMPOSITION

CROSS REFERENCE TO RELATED APPLICATIONS

This application is a Continuation-In-Part of U.S. application Ser. No. 13/496,531 filed Mar. 16, 2012, now U.S. Pat. No. 8,920,552, which claims priority under 35 U.S.C. §371 from PCT Application No. PCT/US2010/050655, filed in English on Sep. 29, 2010, which claims the benefit of U.S. Provisional Application No. 61/247,316, filed Sep. 30, 2009, the disclosures of all of which are incorporated herein by reference in their entireties.

BACKGROUND OF THE INVENTION

Thermal ink jet (TIJ) print heads produce ink droplets from thermal vaporization of the ink solvent. In the jetting process, a resistor is heated rapidly to produce a vapor bubble which subsequently ejects a droplet from the orifice. This process is extremely efficient and reproducible. Modern TIJ print heads for industrial graphics applications are capable of generating uniform drops of 4 pL or smaller in volume at frequencies of 36 kHz or greater. Typical commercial TIJ devices are specifically designed to vaporize water or solvents that have physical properties close to those of water (e.g. high boiling point, large heat capacity, low molecular weight).

Although TIJ printing systems have been available for over 30 years, most of the commercial inks available for thermal ink jet systems have been water-based, i.e. they contain more than 50% water. Such aqueous inks have one or more drawbacks such as long ink dry times or poor adhesion to semi-porous or non-porous substrates. Since around 2009 an increasing number of solvent-based TIJ inks have been proposed or introduced, with varying degrees of success. These formulas have performance and shelf-life limitations due to material incompatibility with traditional thermal ink jet cartridges.

There is a desire for inks with attractive performance characteristics such as short dry times, long decap times and good adhesion when using a TIJ system to print onto semi-porous and non-porous substrates.

BRIEF SUMMARY OF THE INVENTION

The invention provides a thermal ink jet ink composition including a volatile organic solvent, a binder resin, a dye, a humectant, and an additive for extending the decap time. The thermal ink jet ink composition may provide increased decap time and short dry times.

In an embodiment, a thermal ink jet ink composition includes one or more volatile organic solvents, one or more binder resins, one or more dyes, a humectant in an amount less than 40% by weight of the thermal ink jet ink composition, and an additive for extending thedecap time. The additive is present in an amount greater than 0.1% by weight of the thermal ink jet ink composition. The additive is selected from plasticizers, surfactants, aliphatic hydrocarbons, drying oils and mixtures thereof. The additive does not phase separate from the ink jet composition during application of the ink to a substrate in thermal ink jet printing.

In another embodiment, a method for printing images on a substrate with a thermal ink jet printer includes directing a stream of droplets of a thermal ink jet ink composition to a substrate. The ink composition includes one or more volatile organic solvents, one or more binder resins, one or more dyes, a humectant in an amount less than 40% by weight of the thermal ink jet ink composition, and an additive in an amount greater than 0.1% by weight of the thermal ink jet ink composition. The additive is selected from plasticizers, surfactants, aliphatic hydrocarbons, drying oils, and mixtures thereof. The ink droplets are allowed to dry, thereby printing an image on the substrate. The decap time of the ink is greater than 2 minutes.

In another embodiment, a thermal ink jet ink composition includes one or more volatile organic solvents, one or more binder resins, one or more dyes, a humectant in an amount less than 40% by weight of the thermal ink jet ink composition, and an additive for extending the decap time. The additive is present in an amount greater than 0.01% by weight of the thermal ink jet ink composition. The additive is selected from nonionic surfactants and ionic surfactants.

In another embodiment, a thermal ink jet ink composition includes a volatile organic solvent; a binder resin, wherein the binder resin is present in an amount from 0.3% to 8% by weight of the ink composition; a dye; a humectant in an amount from 1% to 40% by weight of the ink composition; and an additive for extending the decap time of the ink composition. The additive is present in an amount less than 0.1% by weight of the ink composition. The additive is selected from perfluoropolyethers, modified perfluoropolyethers, glycol-based perfluoroalkyl ethers, perfluoroalkyl substituted polyethers, and mixtures thereof. If water is present, it is present in amount less than 10% by weight of the ink composition. The ink composition has a decap time of greater than 15 seconds in a thermal ink jet printer.

The thermal ink jet ink composition of the invention has one or more of the following features: short dry times, long decap times, good adhesion to substrates, safety, and material compatibility. Decap time is defined as the amount of time a nozzle can remain dormant and then be fired again without detrimental effect on the droplet velocity, weight or direction. Fluids with good material compatibility are defined as those which do not degrade the ability of the TIJ cartridge to fire for some commercially reasonable length of time. The thermal ink jet ink composition does not require heat assist (e.g., thermal driers) when printed on semi-porous and non-porous substrates.

DETAILED DESCRIPTION OF THE INVENTION

The disclosure provides a thermal ink jet ink composition including volatile organic solvents, humectants, binder resins, colorants, and an additive.

In an embodiment, the invention provides a thermal ink jet ink composition including one or more volatile organic solvents, one or more humectants, one or more binder resins, and one or more dyes. The humectants are preferably present in an amount not more than 40% by weight of the thermal ink jet ink composition. The volatile organic solvents may be selected from $C_1$-$C_4$ alcohols, $C_4$-$C_8$ ethers, $C_3$-$C_6$ ketones, $C_3$-$C_6$ esters, and mixtures thereof.

The thermal ink jet ink composition includes an additive to extend the decap time in a thermal ink jet printer. The additive is present in an amount greater than 0.01% by weight of the thermal ink jet ink composition. The additive preferably does not phase separate from the ink jet composition during application of the ink to a substrate in thermal ink jet printing. The additive may be selected from plasticizers, ionic surfactants, nonionic surfactants, aliphatic hydrocarbons, drying oils, and mixtures thereof.

In accordance with an embodiment, the volatile organic solvents may be selected from $C_1$-$C_4$ alcohols, $C_4$-$C_8$ ethers, $C_3$-$C_6$ ketones, $C_3$-$C_6$ esters, and mixtures thereof. Examples of $C_1$-$C_4$ alcohols include methanol, ethanol, 1-propanol, and 2-propanol. Examples of $C_4$-$C_8$ ethers include diethyl ether, dipropyl ether, dibutyl ether and tetrahydrofuran. Examples of $C_3$-$C_6$ ketones include acetone, methyl ethyl ketone and cyclohexanone. Examples of $C_3$-$C_6$ esters include methyl acetate, ethyl acetate and n-butyl acetate. The organic solvents, particularly alcohols, ketones, and esters, have an attractive feature that they penetrate semi- and non-porous substrate surfaces more readily than water based inks, thus reducing dry time and improving adhesion. One or more volatile organic solvents may be present. In particular embodiments the thermal ink jet ink composition includes, as the volatile organic solvent(s), methyl ethyl ketone, a blend of methyl ethyl ketone and methanol, or a blend of methyl ethyl ketone and ethanol as the primary jetting solvent.

The one or more volatile organic solvents may be present in any suitable amount, for example, in an amount 50% or more, about 60% or more, about 70% or more, about 80% or more, or about 90% or more by weight of the thermal ink jet ink composition. In an embodiment, the one or more volatile organic solvents may be present in an amount from 50% to about 99%, preferably from about 60% to about 97%, and more preferably from about 80% to about 95% by weight of the thermal ink jet ink composition. The thermal ink jet ink composition may optionally include water in a suitable amount, e.g., up to 49% by weight, up to about 25% by weight, or up to about 10% by weight, up to about 5% by weight, or up to about 2% by weight of the thermal ink jet ink composition.

The thermal ink jet ink composition may include any suitable colorant or colorants, which may be dye or pigment. In an embodiment of the invention, one or more dyes are employed as the colorant, wherein the one or more dyes are selected from acid dyes, basic dyes, solvent dyes, reactive dyes, disperse dyes, mordant dyes and any combination thereof. Examples of solvent dyes include naphthol dyes, azo dyes, metal complex dyes, anthraquinone dyes, quinoimine dyes, indigoid dyes, benzoquinone dyes, carbonium dyes, naphthoquinone dyes, naphthalimide dyes, phthalocyanine dyes, and perylene dyes. One or more colorants may be present.

For example, the thermal ink jet ink composition can include one or more dyes selected from C.I. Solvent Yellow 19, C.I. Solvent Yellow 21, C.I. Solvent Yellow 61, C.I. Solvent Yellow 80, C.I. Solvent Orange 1, C.I. Orange 37, C.I. Orange 40, C.I. Solvent Orange 54, C.I. Solvent Orange 63, C.I. Solvent Red 8, Solvent Red 49, C.I. Solvent Red 81, C.I. Solvent Red 82, C.I. Solvent Red 84, C.I. Solvent Red 100, C.I. Acid Red 92, C. I. Reactive red 31, Orient Pink 312, C.I. Basic Violet 3, C.I. Basic Violet 4, C.I. Solvent Violet 8, C.I. Solvent Violet 21, C.I. Solvent Blue 2, C.I. Solvent Blue 5, C.I. Solvent Blue 11, C.I. Solvent Blue 25, C.I. Solvent Blue 36, C.I. Solvent Blue 38, C.I. Solvent Blue 55; C.I. Solvent Blue 70, C.I. Solvent Green 3, C.I. Solvent Black 3, C.I. Solvent Black 5, C.I. Solvent Black 7, C.I. Solvent Black 22, C.I. Solvent Black 26, C.I. Solvent Black 27, C.I. Solvent Black 29 (VALIFAST BLACK 3808 or ORASOL RLI), C.I. Acid Black 123, C.I. Solvent Black 48 (MORFAST BLACK 101), C.I. Oil Blue 613, and any combination thereof, and preferably one or more dyes selected from C.I. Solvent Black 29 (VALIFAST BLACK™ 3808 or ORASOL BLACK Rum), C.I. Solvent Black 27, C.I. Solvent Black 48, C.I. Solvent Black 3 (Oil Black 860), C.I. Basic Violet 3, C.I. Solvent Blue 38, C.I. Solvent Blue 70, C.I. Oil Blue 613, C.I. Solvent Red 49 (ORIENT PINK™ 312), C.I. Solvent Orange 54 (VALIFAST ORANGE™ 3210), and any combination thereof.

Any suitable pigment can be used, for example, one or more pigments selected from phthalocyanine blue, carbon black, mars black, quinacridone magenta, ivory black, prussian blue, cobalt blue, ultramarine blue, manganese blue, cerulean blue, indathrone blue, chromium oxide, iron oxides, viridian, cobalt green, terre verte, nickel azo yellow, light green oxide, phthalocyanine green-chlorinated copper phthalocyanine, burnt sienna, perinone orange, irgazin orange, quinacridone magenta, cobalt violet, ultramarine violet, manganese violet, dioxazine violet, zinc white, titanium white, flake white, aluminum hydrate, blanc fixe, china clay, lithophone, arylide yellow G, arylide yellow 10G, barium chromate, chrome yellow, chrome lemon, zinc yellow, cadmium yellow, aureolin, naples yellow, nickel titanate, arylide yellow GX, isoindolinone yellow, flavanthrone yellow, yellow ochre, chromophthal yellow 8GN, toluidine red, quinacridone red, permanent crimson, rose madder, alizarin crimson, vermilion, cadmium red, permanent red FRG, brominated anthranthrone, naphthol carbamide, perylene red, quinacridone red, chromophthal red BRN, chromophthal scarlet R, aluminum oxide, bismuth oxide, cadmium oxide, chromium oxide, cobalt oxide, copper oxide, iridium oxide, lead oxide, manganese oxide, nickel oxide, rutile, silicon oxide, silver oxide, tin oxide, titanium oxide, vanadium oxide, zinc oxide, zirconium oxide, and any combination thereof.

In embodiments, the pigments are selected from azo pigments, phthalocyanine pigments, quinacridone pigments, dioxazine pigments, isoindolinone pigments, metal oxide pigments, carbon black, and any combination thereof.

The pigments may have any suitable particle size, for example, from about 0.005 micron to about 15 microns, preferably from about 0.005 to about 1 micron, and more preferably from about 0.01 to about 0.3 micron.

In any of the embodiments above, the colorant, dye or pigment, may be present in an amount from about 0.01% to about 10%, preferably from about 0.5% to about 7%, and more preferably from about 1% to about 5% by weight of the thermal ink jet ink composition.

In any of the embodiments above, any suitable humectant can be used. Preferably, humectants have a boiling point greater than 150 ° C., greater than 200 ° C., or greater than 250° C., and/or a relative evaporation rate less than 1.0, less than 0.9, less than 0.7, less than 0.4, less than 0.1, or less than 0.01. The humectants typically are solvents having one or more polar functional groups such as hydroxyl, ether, amide, ester, ketone, and carbonate, for example, two functional groups, which may be the same or different, such as two hydroxyl groups or one hydroxyl group and one ether group. In an embodiment, the one or more humectants are selected from polyol, glycol ether, diacetone alcohol, 2-pyrrolidinone, N-methylpyrrolidinone, ethyl lactate, butyl lactate, propylene carbonate, 1,3-dimethyl-2-imidazolidindione, and alkyl esters, and any combination thereof.

For example, the polyol may be selected from polyethylene glycol, polypropylene glycol, poly(ethylene-co-propylene glycol), trimethylol propane, ethylene glycol, glycerin, diethylene glycol, triethylene glycol, tripropylene glycol, tetraethylene glycol, pentaethylene glycol, 1,2-propylene glycol, 1,3-propanediol, butylene glycol, triethylene glycol, 1,2,6-hexanetriol, thiodiglycol, hexylene glycol, bis-2-hydroxyethyl ether, 1,4-butanediol, 1,2-butenediol, 1,4-butenediol, 1,3-butenediol, 1,5-pentanediol, 2,4-pentanediol, 2,4-heptanediol, 1,8-octanediol, 1,10-decanediol, 1,12-dodecanediol, 1,4-cyclohexanediol, 1,4-cyclohexanedimethanol, 1,2-bis(hydroxymethyl)cyclohexane, 1,2-bis(hydroxyethyl)-cyclohexane, 3-methyl-1,5-pentanediol, 2,2,4-trimethyl-1,3-pentanediol, neopentyl glycol, pentaerythritol, sorbitol, mannitol, and any combination thereof, and preferably the polyol is selected from polyethylene glycol, trimethylol propane, ethylene glycol, propylene glycol, glycerin, diethylene glycol, tripropylene glycol, and any combination thereof, A preferred humectant is glycol ether, for example, a glycol ether selected from ethylene glycol monomethyl ether, ethylene glycol monoethyl ether, propylene glycol monomethyl ether, tripropylene glycol monomethyl ether, ethylene glycol monobutyl ether, diethylene glycol monomethyl ether, diethylene glycol monoethyl ether, propylene glycol n-propyl ether, propylene glycol t-butyl ether, propylene glycol n-butyl ether, dipropylene glycol methyl ether, dipropylene glycol n-propyl ether, dipropylene glycol t-butyl ether, dipropylene glycol n-butyl ether, tripropylene glycol n-propyl ether, tripropylene glycol t-butyl ether, tripropylene glycol n-butyl ether, ethyl cellosolve, methyl cellosolve, polyethylene glycol monomethyl ether, polypropylene glycol monomethyl ether, methoxytriglycol, ethoxytriglycol, butoxytriglycol, 1-butoxyethoxy-2-propanol, and any combination thereof, and preferably, the glycol ether is selected from ethylene glycol monomethyl ether, ethylene glycol monoethyl ether, propylene glycol monomethyl ether (Propasol M), tripropylene glycol monomethyl ether, ethylene glycol monobutyl ether, diethylene glycol monomethyl ether, diethylene glycol monoethyl ether, propylene glycol monopropyl ether (Propasol P), and any combination thereof. In certain embodiments, propylene glycol monomethyl ether is a preferred humectant. In other embodiments, propylene glycol monopropyl ether is a preferred humectant.

Humectants may contribute, at least in part, to a feature of the thermal ink jet ink composition. Thus, humectants may help lengthen decap times. In any of the embodiments, the one or more humectants may be present in any suitable amount, for example, in an amount about 40% or less, preferably about 30% or less, about 25% or less, about 20% or less, about 15% or less, or about 10% or less, by weight of the ink composition. The one or more humectants may be present in an amount about 0.1%, 0.5%, 1%, 2%, or 5% or more by weight of the ink composition. In an embodiment, the one or more humectants may be present in an amount from about 0.1% to about 30%, preferably from about 0.5% to about 15%, and more preferably from about 1% to about 10% by weight of the thermal ink jet ink composition.

As discussed, the thermal ink jet ink composition includes one or more binder resins. Any suitable binder resin, soluble or dispersible, can be employed, preferably a solvent soluble binder resin. In an embodiment, the thermal ink jet ink composition includes one or more binder resins selected from polyamide resins, polyurethane resins, rosin ester resins, acrylic resins, polyvinyl butyral resins, polyesters, phenolic resins, vinyl resins, polystyrene/polyacrylate copolymers, cellulose ethers, cellulose nitrate resins, polymaleic anhydrides, acetal polymers, polystyrene/polybutadiene copolymers, polystyrene/polymethacrylate copolymers, sulfonated polyesters, aldehyde resins, polyhydroxystyrene resins, sulfonamide-modified epoxy resins, sulfonamide-modified formaldehyde resins, sulfonamide-modified melamine formaldehyde resins and polyketone resins, and any combination thereof, and preferably one or more binder resins selected from cellulose nitrate resins, polyamide resins, rosin ester resins, acrylic resins, polyvinyl butyral resins, vinyl resins, polyhydroxystyrene resins, sulfonamide-modified epoxy resins and any combination thereof. An example of a suitable polyamide resin is ARIZONA 201-150™ available from Arizona Chemical Company, Jacksonville, Fla., or COGNIS VERSAMID 756™, available from Cognis GmbH, Monheim am Rhein, Germany, both of which are alcohol-soluble polyamide resins. Examples of wood rosin ester resins include UNIREZ™ 8115, available as a 40% solution in ethanol from Penn Color, Doylestown, Pa., which is a hydrogenated wood rosin ester, STAYBELITE™ ESTER 10, available from Chem Central Corporation and SUPERESTER™ A-75, available from Arakawa-USA. Examples of cellulose nitrate resins are NOBEL™ DHX 3-4, NOBEL™ DLX 3-5 or NOBEL™ DHX 5-8, available from Nobel Enterprises. Examples of polyvinyl butyral resins are PIOLOFORM™ BN18, available from Wacker Chemie AG, and MOWITAL™ B20H available from Kuraray America, Inc. Examples of acrylic and styrene/acrylic resins are JONCRYL™ 611, 682, and 586 (available from BASF, USA) and PARALOID™ B-66 and B-72 (available from Dow Chemical, USA). Examples of vinyl resins include UCAR™ VYHH, VMCH, YMCA, and VAGF (available from Dow Chemical Company, USA) and VINNOL™ E15/45, H14/36, E15/45M, and E16/40A (available from Wacker Chemie AG, Germany). Examples of polyhydroxystyrene resins include P-HYDROXYSTYRENE BRANCHED GRADE PBS, available from Hydrite Chemical Company. Examples of sulfonamide-modified epoxy resins include ADPRO™ MTS (available from Rit-Chem).

The polymeric binder resin can be present in any suitable amount, for example, in an amount from about 0.1% to about 30%, preferably from about 0.2% to about 15%, and more preferably from about 0.3% to about 8% of the thermal ink jet ink composition. The binder resin may be present in an amount less than 15%, 12%, 10%, 8%, or 5% by weight of the ink composition.

In a particular embodiment of the thermal ink jet ink composition, the volatile organic solvent or solvents may be present in an amount from about 50% to about 95% by weight, the colorant(s) (dyes, pigments, or a combination thereof), may be present in amount from about 1% to about 8% by weight, the humectant or humectants may be present in an amount from about 1% to 30% by weight, the binder resin or binder resins may be present in an amount from about 1% to about 8% by weight, and the additive may be present in an amount from about 0.01% to 10% by weight of the thermal ink jet ink composition.

The thermal ink jet ink composition may further include one or more additives to extend decap time, such as plasticizers, ionic surfactants, nonionic surfactants, aliphatic hydrocarbons, drying oils, and mixtures thereof. The additive preferably does not phase separate from the ink jet composition during application of the ink to a substrate in thermal ink jet printing. Examples of ionic and nonionic surfactants include siloxanes, silicones, silanols, polyether modified polydimethylsiloxanes, polyether modified polysiloxanes, ethoxylated alcohols, propoxylated alcohols, alcohol ethoxylates, secondary alcohol ethoxylates, polyoxyalkylenes, unmodified sulfosuccinates, monoester sulfosuccinates, diester sulfosuccinates, modified sulfosuccinates, amine alkylbenzene sulfonates, phosphate esters of an akylphenoxy polyethoxyethanol, polyoxoalkylenes, polyethylene glycol octylphenyl ethers, alkylated tallow amines, polyoxyalkyleneamines, propoxylated (poly(oxypropylene)) diamines, alkyl ether amines, nonyl phenol ethoxylates, ethoxylated fatty amines, quaternized copolymers of vinylpyrrolidone and dimethyl aminoethyl methacrylate, fluorinated organic acid diethanolamine salts, perfluoropolyethers, modified perfluoropolyethers, glycol-based perfluoroalkyl ethers, perfluoroalkyl substituted polyethers, fluorinated polyacrylates, alkoxylated ethylenediamines, polyethylene oxides, polyoxyalkylene polyalkylene polyamines, polyoxyalkylene polyalkylene polyimines, alkyl phosphate ethoxylate mixtures, phosphate esters, polyglycol esters, diester sulfosuccinates, polyoxyalkylene derivatives of propylene glycol, organic esters, EO/PO block copolymers, acetylenic diols, ethoxylated acetylenic diols, propoxylated acetylenic diols, acrylic block copolymers, hydrogenated castor oil and polyoxyethylated fatty alcohols. A specific example of a suitable polymeric surfactant, e.g., Silicone Fluid SF-69, available from Dow Corning Co, Midland, Mich., which is a blend of silanols and cyclic silicones. Additional examples of polymeric surfactants include DISPERSYBYK™ (BYK-Chemie, USA), SOLSPERSE™ (e.g., SOLSPERSE 13940 which is a polymer/fatty acid condensation polymer) and EFKA™ (EFKA Chemicals) polymeric dispersants. Additional examples of non-ionic surfactants include ETHYLAN NS-500LQ (Akzo Nobel), SURFYNOL 104 (Air Products), SERDOX™ ZTG-110 (Elementis), TERGITOL 15-S-7 (Dow), and MAKON™ DA-6 (Stepan). Additional examples of ionic surfactants include ETHOPROPMEEN™ (AkzoNobel), G-3300 (Stepan), AEROSOL™ LF-4, AEROSOL™ WA-300 and AEROSOL™ OT-70 PG (Air Products).

In any of the embodiments, the surfactant additive may be present in an amount from about 0.01 to about 5.0% by weight, preferably from about 0.05 to about 3% by weight of the thermal ink jet ink composition. When a fluorinated surfactant is used, such as the above-listed fluorinated organic acid diethanolamine salts, perfluoropolyethers, modified perfluoropolyethers, glycol-based perfluoroalkyl ethers, perfluoroalkyl substituted polyethers, fluorinated polyacrylates, it has been found, surprisingly and unexpectedly, that even a small amount of fluorinated surfactant can improve the decap time of the ink composition. Thus, the fluorinated surfactant may be present in an amount less than 0.1% by weight of the ink composition. In another embodiment, the fluorinated surfactant may be present in an amount less than 0.05% or less than 0.03% by weight of the ink composition.

Examples of suitable plasticizers include phthalate plasticizers, e.g., alkyl benzyl phthalates, butyl benzyl phthalate, dioctyl phthalate, diisobutyl phthalate, dicyclohexyl phthalate, diethyl phthalate, dimethyl isophthalate, dibutyl phthalate, and dimethyl phthalate, esters such as di-(2-ethylhexy)-adipate, diisobutyl adipate, glycerol tribenzoate, sucrose benzoate, polypropylene glycol dibenzoate, neopentyl glycol dibenzoate, dibutyl sebacate, and tri-n-hexyltrimellitate, and sulfonamide plasticizers such as PLASTICIZER 8, available from Monsanto Co., St. Louis, Mo., which is n-ethyl o,p-toluene sulfonamide.

In embodiments of the invention, the plasticizer additive may be present in an amount from about 0.2 to about 5.0% by weight, preferably from about 0.3 to about 3.0%, and more preferably from about 0.5 to about 2.0% of the thermal ink jet ink composition.

Examples of aliphatic hydrocarbons that may be used as additives include cyclic or straight chain hydrocarbons, either saturated or unsaturated. The aliphatic hydrocarbon additive may be present in an amount from about 0.1 to about 5.0% by weight, preferably from about 0.5 to about 2% by weight of the thermal ink jet ink composition.

Examples of drying oils that may be used as additives include tung oil, linseed oil, walnut oil, poppy seed oil and perilla oil. The drying oil additive may be present in an amount from about 0.1 to about 5.0% by weight, preferably from about 0.5 to about 2% by weight of the thermal ink jet ink composition.

The thermal ink jet ink composition may include additional ingredients such as bactericides, fungicides, algicides, sequestering agents, buffering agents, corrosion inhibitors, antioxidants, light stabilizers, anti-curl agents, thickeners, and other agents known in the relevant art. In an embodiment, the ink composition is free or substantially free of antioxidants. The ink composition preferably includes no more than small amounts of water. In particular, the ink composition may include less than 10%, 5%, 2%, 1%, 0.5%, or 0.1% by weight water. The ink composition may be substantially free of water.

The thermal ink jet ink composition has one or more attractive features such as short unassisted dry times of printed alphanumeric or graphic images, long decap times, good adhesion to semi-porous and non-porous substrates, and safety or material compatibility with one or more components of a thermal ink jet printer. For example, embodiments of the thermal ink jet ink composition have a dry time of about 10 seconds or less, such as 5 seconds or less, 4 seconds or less, or 2 seconds or less, under ambient conditions. On porous substrates, the dry times are shorter than in semi- or non-porous substrates. For example, embodiments of the thermal ink jet ink composition have a dry time of about 1 second on porous substrates and less than about 5 seconds, preferably less than about 2 seconds, and more preferably less than about 1 second on semi-porous substrates. The thermal ink jet ink composition preferably has a decap time of at least 15 seconds, more preferably at least 30 seconds, more preferably at least 1 minute, 2 minutes, or 5 minutes, and most preferably at least 10 minutes, when used in a thermal ink jet print head.

The thermal ink jet ink composition may have any suitable viscosity or surface tension. In embodiments of the invention, the thermal ink jet ink composition has a viscosity of less than about 10 cPs, preferably less than about 5 cPs, and more preferably less than about 3 cPs, for example, a viscosity from about 1 to 4 or from about 1 to about 3 cPs at 25° C.

In embodiments of the invention, the thermal ink jet ink composition has a surface tension from about 18 to about 50 mN/m, from about 20 to about 40 mN/m, or from about 22 to about 30 mN/m at 25° C.

The thermal ink jet ink composition may be prepared by any suitable method. For example, the chosen ingredients may be combined and mixed with adequate stiffing and the resulting fluid filtered to remove any undissolved impurities.

The present disclosure further provides a method for printing images on a substrate in a thermal ink jet printer comprising directing a stream of droplets of any of the embodiments of the thermal ink jet ink composition to a substrate and allowing the ink droplets to dry, thereby printing images on a substrate. Any suitable substrate may be printed in accordance with the invention. Examples of suitable substrates include porous substrates such as uncoated paper, semi-porous substrates such as aqueous coated paper, clay coated paper, silica coated paper, UV overcoated paper, polymer overcoated paper, and varnish overcoated paper, and non-porous substrates such as hard plastics, polymer films, polymer laminates, metals, metal foil laminates, glass, and ceramics. The paper substrates may be thin sheets of paper, rolls of paper, or cardboard. Plastics, laminates, metals, glass, and ceramic substrates may be in any suitable form such as in the form of bottles or containers, plates, rods, cylinders, etc.

Examples of polymer coating include a coating of polystyrene, polyvinyl alcohol, polyacryate, polymethacrylate, polystryrene or polyvinyl chloride. Examples of polymer film substrates include polyvinyl butyrals, polyolefins, polyvinyl chloride, polyethylene terephthalate, PETG, polybutylene terephthalate (PBT), polyester, polycarbonate, acrylonitrile-butadiene-styrene (ABS) copolymer, polyvinyl fluoride polymer, polyamides, polyimides, and cellulose. Plastics may be treated plastics (e.g. chemical etch, corona discharge, flame plasma, etc.) or untreated plastics. Examples of metals include aluminum, copper, stainless steel, and metal alloys. Examples of ceramics include oxides, nitrides, and carbides of metals.

The following Examples further illustrate the invention but, of course, should not be construed as in any way limiting its scope. The following Examples illustrate the preparation of an ink composition suitable for use in a thermal ink printer. In each case, the ingredients were combined and mixed until all solid components were dissolved. The resulting mixture was filtered to remove any particulates and the ink composition was recovered. The ink composition was printed using a representative thermal ink jet printer on a variety of non-porous substrates including glass, aluminum, polyethylene, polypropylene, foils, polyester, polyamide and polyvinyl chloride. The decap time was measured by one of two methods. Method 1 is by printing an image consisting of 100 vertical bars that were 1 dot wide for the full width of the nozzle array, allowing the print head to remain idle for the specified period of time, then reprinting the same image without wiping or other maintenance. The decap time is the maximum amount of time the print head can remain uncapped and fully recover within the first 20% of the vertical lines. Method 2 of measuring the decap time is by printing a standard alphanumeric image repeatedly (between 10 and 100 times), allowing the print head to remain idle for a specified period of time, then reprinting the same image without wiping or other maintenance. Method 1 was used for determining the decap time in Examples 1-4 below, and Method 2 was used for determining the decap time in Examples 5-10 below. The decap time is the maximum amount of time the print head can remain uncapped and recover with a fully legible image. The drying time was measured by printing representative alphanumeric text, and gently sliding a finger across the text every second (or interval of seconds) and observing when the image no longer smears.

Example 1

This example illustrates embodiments of the thermal ink jet ink composition of the invention. The materials employed in preparing the thermal ink jet ink composition, their amounts, and the formulation numbers are set forth in Table 1 below. For the 5542 and 5543 samples, N-Ethyl O/P-Toluene Sulfonamide was used as an additive to increase decap time. Comparative Example A did not include N-Ethyl O/P-Toluene Sulfonamide.

TABLE 1

|  | Comparative Example A | 5542 | 5543 |
|---|---|---|---|
| ethanol | 67.45 | 66.45 | 65.45 |
| glycol ether PM | 15 | 15 | 15 |
| water | 5 | 5 | 5 |
| Arizona 201-150 (20% in ethanol) | 10 | 10 | 10 |
| Silicone SF69 | 0.05 | 0.05 | 0.05 |
| Solvent Red 49 | 1.5 | 1.5 | 1.5 |
| Solvent Orange 54 | 1.0 | 1.0 | 1.0 |
| N-Ethyl O/P-Toluene Sulfonamide |  | 1 | 2 |
| Decap Time (seconds) | 8" | 15" | 30" |
| Dry Time (seconds) - Semi-Porous Surface (Clay coated paper) | 1" | 1" | 1" |
| Dry Time (seconds) Aqueous coated paper) | ≤5" | ≤5" | ≤5" |

The printed images were found to have a drying time of 1 second or less on semi-porous and 5 seconds or less on aqueous coated surfaces. The images had excellent rub resistance and adhesion properties. Sample 5543 had a decap time of at least 30 seconds, compared to 8 seconds for Comparative Example A.

Example 2

This example illustrates embodiments of the thermal ink jet ink composition of the invention. The materials employed in preparing the thermal ink jet ink composition, their amounts, and the formulation numbers are set forth in Table 2 below. For the 5572 and 5573 samples, a silicone surfactant was used as an additive to increase decap time. Comparative Example B did not include the silicone surfactant.

TABLE 2

|  | Comparative Example B | 5572 | 5573 |
|---|---|---|---|
| ethanol | 90.25 | 90.05 | 89.75 |
| glycol ether PM | 3.13 | 3.13 | 3.13 |
| Arizona 201-150 (20% in ethanol) | 3.73 | 3.73 | 3.73 |
| Plasticizer 8 | 0.50 | 0.50 | 0.50 |
| Solvent Red 49 | 1.39 | 1.39 | 1.39 |
| Solvent Orange 54 | 1.00 | 1.00 | 1.00 |
| Silicone SF69 |  | 0.20 | 0.50 |
| Decap Time (seconds) | 8" | 30-60" | 120" |
| Dry Time (seconds) - Semi-Porous Surface (Clay coated paper) | 1" | 1" | 1" |
| Dry Time (seconds) - Non-Porous Surface (Aqueous and Varnish coated paper) | 2.5" | 2.5" | 2.5" |

The printed images were found to have a drying time of 1 second or less on semi-porous surfaces and a drying time of 2.5 seconds on non-porous surfaces. The images had excellent rub resistance and adhesion properties. The images had acceptable print quality. Sample 5573 had a decap time of at least 2 minutes, compared to 8 seconds for Comparative Example B.

Example 3

The materials employed in preparing the thermal ink jet ink composition, their amounts, and the formulation numbers are set forth in Table 3 below. For the 5605 sample, Magiesol 500/600 was used as an additive to increase decap time. Comparative Example C did not include Magiesol 500/600.

TABLE 3

|  | Comparative Example C | 5506 |
|---|---|---|
| methanol | 47.50 | 43.18 |
| methyl ethyl ketone | 47.50 | 43.18 |
| Joncryl 682 | 3.47 | 3.16 |
| Silicone SF69 | 0.03 | 0.03 |
| Basic Violet 3 | 1.50 | 1.36 |
| Magiesol 500/600 |  | 9.09 |
| Decap Time (seconds) | 15" | 300-600" |
| Dry Time (seconds) - Semi-Porous Surface (Clay coated paper) | 1" | 1" |
| Dry Time (seconds) - Non-Porous Surface (Aqueous and Varnish coated paper) | 1" | >5" |

The printed images were found to have a drying time of 1 second or less on semi-porous surfaces. The images had excellent rub resistance and adhesion properties. The images had acceptable print quality. Sample 5605 had a decap time of 5 to 10 minutes, compared to 15 seconds for Comparative Example C.

Example 4

This example illustrates embodiments of the thermal ink jet ink composition of the invention. The materials employed in preparing the thermal ink jet ink composition, their amounts, and the formulation numbers are set forth in Table 4 below. For the 5600 sample, tung oil was used as an additive to increase decap time. Comparative Example D did not include tung oil.

TABLE 4

|  | Comparative Example D | 5600 |
| --- | --- | --- |
| MEK | 46.2 | 43.7 |
| MeOH | 46.2 | 43.7 |
| glycol ether PM | 3.5 | 3.5 |
| Joncryl 682 | 2 | 2 |
| Silicone SF69 | 0.05 | 0.05 |
| Basic Violet 3 | 2 | 2 |
| Tung oil |  | 5 |
| Decap Time (seconds) | 30-60" | >900" |
| Dry Time (seconds) - Semi-Porous Surface (Clay coated paper) | 1" | 1" |
| Dry Time (seconds) - Non-Porous Surface (Aqueous and Varnish coated paper) | 1" | >5" |

The printed images were found to have a drying time of 1 second or less on semi-porous surfaces. The images had excellent rub resistance and adhesion properties. Sample 5600 had a decap time of at least 15 minutes, compared to 30-60 seconds for Comparative Example D.

Example 5

This example illustrates embodiments of the thermal ink jet ink composition of the invention. The materials employed in preparing the thermal ink jet ink composition, their amounts, and the formulation numbers are set forth in Table 5 below. Examples 6476 and 6481 demonstrated that decap performance of the ink composition was improved by the addition of SuperEster A-75, a wood rosin ester resin.

TABLE 5

| Component | Comparative Example E | 6476 | 6481 |
| --- | --- | --- | --- |
| ethanol SDA-3C | 87.33 | 86.4 | 85.35 |
| Propasol P | 5.56 | 5.56 | 6 |
| Polyhydroxystyrene resin (PHS) | 2.78 | 2.78 | 3 |
| SuperEster A-75 | 0 | 0.93 | 1 |
| Plasticizer 8 | 0.46 | 0.46 | 0.5 |
| SF69 | 0.05 | 0.05 | 0.05 |
| Silwet L 7622 | 0.09 | 0.09 | 0.1 |
| Valifast Black 3808 | 3.01 |  | 3.25 |
| Valifast Black 3840 |  |  |  |
| Orasol Black RLI |  | 3.01 |  |
| Valifast Orange 3210 | 0.69 | 0.69 | 0.75 |
| total | 100.0 | 100.0 | 100.0 |
| DRY TIME | <2 sec | <2 sec | <2 sec |
| DECAP TIME | 20 sec | >1 min | >1 min |

The printed images were found to have a drying time of 2 seconds or less on non-porous surfaces. The images had excellent rub resistance and adhesion properties. Samples 6476 and 6481 had a decap times of at least 1 minute, compared to 20 seconds for Comparative Example E.

Example 6

This example illustrates embodiments of the thermal ink jet ink composition of the invention. The materials employed in preparing the thermal ink jet ink composition, their amounts, and the formulation numbers are set forth in Table 6 below. The Fluorolink polymers used are modified perfluoropolyethers. Fluorolink S10 is a fluorosurfactant that is the reaction product of 3-(triethoxysilyl)-1-propanamine with ethyl esters of reduced, polymerized oxidized poly (tetrafluroethylene). Fluorolink A10P is a fluorosurfactant that is the reaction product of 1-octadecanamine with ethyl esters of reduced, polymerized oxidized poly (tetrafluroethylene). Fluorolink E10H is a fluorosurfactant that is an ethoxylated diol derivative of reduced, polymerized oxidized poly (tetrafluroethylene). Capstone FS-3100 is a fluorosurfactant that is a partially fluorinated alcohol substituted glycol.

Surprisingly and unexpectedly, Examples M-4, M-9, M-10 and M-11 all demonstrated that addition of 0.25% or less of modified PFPE esters improved decap times over Comparative Example F.

TABLE 6

| Component | Comparative Example F | M-4 | M-9 | M-10 | M-11 |
| --- | --- | --- | --- | --- | --- |
| MEK | 76.35 | 76.1 | 76.1 | 76.3 | 76.25 |
| Propasol P | 10 | 10 | 10 | 10 | 10 |
| diacetone alcohol | 6 | 6 | 6 | 6 | 6 |
| SuperEster A-75 | 3 | 3 | 3 | 3 | 3 |
| Plasticizer 8 | 0.5 | 0.5 | 0.5 | 0.5 | 0.5 |
| SF69 | 0.05 | 0.05 | 0.05 | 0.05 | 0.05 |
| Silwet L 7622 | 0.1 | 0.1 | 0.1 | 0.1 | 0.1 |
| Fluorolink S10 |  | 0.25 |  |  |  |
| Fluorolink A10P |  |  |  | 0.05 |  |
| Fluorolink E10H |  |  | 0.25 |  |  |
| Capstone FS-3100 |  |  |  |  | 0.1 |
| Valifast Black 3808 | 3.25 | 3.25 | 3.25 | 3.25 | 3.25 |
| Valifast Orange 3210 | 0.75 | 0.75 | 0.75 | 0.75 | 0.75 |
| total | 100.0 | 100.0 | 100.0 | 100.0 | 100.0 |
| DRY TIME | 3 sec | 3 sec | 4 sec | 4 sec | 3 sec |
| DECAP TIME | 40 sec | >1 min | >1 min | >1 min | >1 min |

The printed images were found to have a drying time of 4 seconds or less on non-porous surfaces. The images had excellent rub resistance and adhesion properties. Samples M-4, M-9, M-10 and M-11 had decap times of at least 1 minute, compared to 40 seconds for Comparative Example F. Comparative Example F did not contain a modified perfluoropolyether. It was unexpected that such a small amount of additive (less than 0.1% by weight of the ink composition) would dramatically improve the decap performance of the ink composition.

Example 7

This example illustrates embodiments of the thermal ink jet ink composition of the invention. The materials employed in preparing the thermal ink jet ink composition, their amounts, and the formulation numbers are set forth in Table 7 below. Examples M-5, M-6 and M-8 demonstrated that decap was improved by addition of 0.25% of Fluorolink S10.

TABLE 7

| Ink # | Comparative Example G | M-6 | M-8 |
|---|---|---|---|
| MEK | 77.85 | 77.60 | 77.67 |
| Propasol P | 10.00 | 10.00 | 10.00 |
| diacetone alcohol | 6.00 | 6.00 | 6.00 |
| SuperEster A-75 | 1.50 | 1.50 | 1.50 |
| Plasticizer 8 | 0.50 | 0.50 | 0.50 |
| SF69 | 0.05 | 0.05 | 0.03 |
| Silwet L 7622 | 0.10 | 0.10 | 0.05 |
| Fluorolink S10 | | 0.25 | 0.25 |
| Valifast Black 3808 | 3.25 | 3.25 | 3.25 |
| Valifast Orange 3210 | 0.75 | 0.75 | 0.75 |
| total | 100.0 | 100.0 | 100.0 |
| DRY TIME | 5 sec | 4 sec | 4 sec |
| DECAP TIME | 40 sec | >1 min | >1 min |

The printed images were found to have a drying time of 5 seconds or less on non-porous surfaces. The images had excellent rub resistance and adhesion properties. Samples M-6 and M-8 had decap times of at greater than 1 minute, compared to 40 seconds for Comparative Example G. Comparative Example G did not contain a modified perfluoropolyether.

Example 8

This example illustrates embodiments of the thermal ink jet ink composition of the invention. The materials employed in preparing the thermal ink jet ink composition, their amounts, and the formulation numbers are set forth in Table 8 below.

TABLE 8

| Component | Comparative Example H | PFPE-3 | PFPE-8 | PFPE-9 |
|---|---|---|---|---|
| MEK | 79.36 | 79.16 | 79.16 | 79.31 |
| Propasol P | 10.88 | 10.85 | 10.85 | 10.88 |
| diacetone alcohol | 1.86 | 1.86 | 1.86 | 1.86 |
| Ad-Pro MTS | 3.63 | 3.62 | 3.62 | 3.63 |
| Plasticizer 8 | 0.49 | 0.49 | 0.49 | 0.49 |
| SF69 | 0.05 | 0.05 | 0.05 | 0.05 |
| Silwet L 7622 | 0.10 | 0.10 | 0.10 | 0.10 |
| Fluorolink E10-H | | 0.25 | | |
| Fluorolink A10-P | | | 0.25 | 0.05 |
| Valifast Black 3808 | 2.94 | 2.93 | 2.93 | 2.94 |
| Valifast Orange 3210 | 0.69 | 0.69 | 0.69 | 0.69 |
| total | 100.0 | 100.0 | 100.0 | 100.0 |
| DRY TIME | 3 sec | 3 sec | 3 sec | 30 sec |
| DECAP TIME | 30 sec | 50 sec | >1 min | >1 min |

The printed images were found to have a drying time of 3 seconds or less on non-porous surfaces. The images had excellent rub resistance and adhesion properties. Samples PFPE-3, PFPE-8, and PFPE-9 had decap times of 50 seconds or longer, compared to 30 seconds for Comparative Example H. Comparative Example H did not contain a modified perfluoropolyether.

Example 9

This example illustrates embodiments of the thermal ink jet ink composition of the invention. The materials employed in preparing the thermal ink jet ink composition, their amounts, and the formulation numbers are set forth in Table 9 below. Trimethylolpropane and 1,6-hexanediol are polyols. Chemphos TC-310 is an alkylphenolethoxylate phosphate ester. Stepfac 8170 and 8171 are phosphate esters of an akylphenoxy polyethoxyethanol. Stepfac 8180 and 8181 are phosphate esters of an akyl polyethoxyethanol. Dextrol OC-22 is the free acid form of a nonylphenol ethoxylated phosphate ester. Dextrol OC-70 is the free acid form of a tridecyl alcohol ethoxylated phosphate ester.

TABLE 9

| Component | Comparative Example I | M-12 | M-13 | M-14 | M-15 | M-16 | 12348 | 12353 | 12349 | M-17 | M-18 | 12363 |
|---|---|---|---|---|---|---|---|---|---|---|---|---|
| MEK | 75.35 | 70.35 | 70.35 | 74.85 | 74.35 | 74.35 | 72.35 | 72.35 | 72.35 | 72.35 | 72.35 | 72.35 |
| Propasol P | 10.00 | 10.00 | 10.00 | 10.00 | 10.00 | 10.00 | 10 | 10 | 10 | 10 | 10 | 10 |
| DiAce-OH | 6.00 | 6.00 | 6.00 | 6.00 | 6.00 | 6.00 | 6 | 6 | 6 | 6 | 6 | 6 |
| PHS | 2.00 | 2.00 | 2.00 | 2.00 | 2.00 | 2.00 | 2 | 2 | 2 | 2 | 2 | 2 |
| SE A-75 | 2.00 | 2.00 | 2.00 | 2.00 | 2.00 | 2.00 | 2 | 2 | 2 | 2 | 2 | 2 |
| Plast-8 | 0.50 | 0.50 | 0.50 | 0.50 | 0.50 | 0.50 | 0.5 | 0.5 | 0.5 | 0.5 | 0.5 | 0.5 |
| SF69 | 0.05 | 0.05 | 0.05 | 0.05 | 0.05 | 0.05 | 0.05 | 0.05 | 0.05 | 0.05 | 0.05 | 0.05 |
| Silwet L7622 | 0.10 | 0.10 | 0.10 | 0.10 | 0.10 | 0.10 | 0.1 | 0.1 | 0.1 | 0.1 | 0.1 | 0.1 |
| OB RLI | 3.25 | 3.25 | 3.25 | 3.25 | 3.25 | 3.25 | 3.25 | 3.25 | 3.25 | 3.25 | 3.25 | 3.25 |
| VO 3210 | 0.75 | 0.75 | 0.75 | 0.75 | 0.75 | 0.75 | 0.75 | 0.75 | 0.75 | 0.75 | 0.75 | 0.75 |
| trimethylolpropane | | 5.00 | | | | | | | | | | |
| 1,6-hexanediol | | | 5.00 | | | | | | | | | |
| Chemphos TC-310 | | | | 0.50 | 1.00 | | | | | | | |

TABLE 9-continued

| Component | Comparative Example I | M-12 | M-13 | M-14 | M-15 | M-16 | 12348 | 12353 | 12349 | M-17 | M-18 | 12363 |
|---|---|---|---|---|---|---|---|---|---|---|---|---|
| sodium methane sulfonate | | | | | | | 1.00 | | | | | |
| Stepfac 8170 | | | | | | | | 3.00 | | | | |
| Stepfac 8171 | | | | | | | | | 3.00 | | | |
| Stepfac 8180 | | | | | | | | | | 3.00 | | |
| Stepfac 8181 | | | | | | | | | | | 3.00 | |
| Dextrol OC-22 | | | | | | | | | | | | 3.00 |
| Dextrol OC-70 | | | | | | | | | | | | 3.00 |
| Total | 100.00 | 100.00 | 100.00 | 100.00 | 100.00 | 100.00 | 100.00 | 100.00 | 100.00 | 100.00 | 100.00 | 100.00 |
| DRY TIME | 5 sec | | | | | | | 5 sec | 4 sec | | | 5 sec |
| DECAP TIME | 2 min | | | | | | | >5 min | 45 sec | | | 1 min |

The printed images were found to have a drying time of 5 seconds or less on non-porous surfaces. The images had excellent rub resistance and adhesion properties. Sample 13353 had a decap time of at least 5 minutes, compared to 2 minutes for Comparative Example I. Comparative Example I did not contain any polyol, sulfonate or phosphate ester additives.

Example 10

This example illustrates embodiments of the thermal ink jet ink composition of the invention. The materials employed in preparing the thermal ink jet ink composition, their amounts, and the formulation numbers are set forth in Tables 10a and 10b below. Stepan G-3300 is an amine alkylbenzene sulfonate. Stepan DA-6, Tergitol 15-S-7, and Tergitol 15-S-3 are alcohol ethoxylates. Ecosurf SA-4 is a mixture of ethoxylated and propoxylated C6-C12 alcohols. Ethylan NS-500LQ is a polyoxoalkylene. Efka-3236 is a modified polysiloxane. Byk-331 and Edaplan LA412 are polyether-modified polysiloxanes. Serdox ZTG-110 is a polyglycol ester. Aerosol LF-4, WA-300 and OT-70PG are modified or unmodified sulfosuccinates. Efka-4340 is an acrylic block copolymer.

TABLE 10a

| Component | Comparative Example J | 104-2 | 104-3 | 104-5 | 104-6 | 104-7 | 104-8 | 104-9 |
|---|---|---|---|---|---|---|---|---|
| MEK | 76.35 | 75.85 | 75.85 | 75.85 | 75.85 | 75.85 | 75.85 | 75.85 |
| Propasol P | 10 | 10 | 10 | 10 | 10 | 10 | 10 | 10 |
| diacetone alcohol | 6 | 6 | 6 | 6 | 6 | 6 | 6 | 6 |
| SuperEster A-75 | 3 | 3 | 3 | 3 | 3 | 3 | 3 | 3 |
| Plasticizer 8 | 0.5 | 0.5 | 0.5 | 0.5 | 0.5 | 0.5 | 0.5 | 0.5 |
| SF69 | 0.05 | 0.05 | 0.05 | 0.05 | 0.05 | 0.05 | 0.05 | 0.05 |
| Silwet L 7622 | 0.1 | 0.1 | 0.1 | 0.1 | 0.1 | 0.1 | 0.1 | 0.1 |
| Stepan G-3300 | | 0.5 | | | | | | |
| Makon DA-6 | | | 0.5 | | | | | |
| EFKA-3236 | | | | 0.5 | | | | |
| Tergitol 15-S-7 | | | | | 0.5 | | | |
| BYK-331 | | | | | | 0.5 | | |
| Ethylan NS-500LQ | | | | | | | 0.5 | |
| Serdox ZTG-110 | | | | | | | | 0.5 |
| Valifast Black 3808 | 3.25 | 3.25 | 3.25 | 3.25 | 3.25 | 3.25 | 3.25 | 3.25 |
| Valifast Orange 3210 | 0.75 | 0.75 | 0.75 | 0.75 | 0.75 | 0.75 | 0.75 | 0.75 |
| total | 100.0 | 100.0 | 100.0 | 100.0 | 100.0 | 100.0 | 100.0 | 100.0 |
| DRY TIME | <2 sec | <2 sec | <2 sec | <2 sec | <2 sec | <2 sec | <2 sec | <2 sec |
| DECAP TIME | 20 sec | 30 sec | 40 sec | 40 sec | 50 sec | 50 sec | 50 sec | >90 sec |

TABLE 10b

| Component | Comparative Example J | 104-10 | 104-11 | 104-12 | 104-13 | 104-14 | 104-15 | 104.17 |
|---|---|---|---|---|---|---|---|---|
| MEK | 76.35 | 75.85 | 75.85 | 75.85 | 75.85 | 75.85 | 75.85 | 75.85 |
| Propasol P | 10 | 10 | 10 | 10 | 10 | 10 | 10 | 10 |
| diacetone alcohol | 6 | 6 | 6 | 6 | 6 | 6 | 6 | 6 |
| SuperEster A-75 | 3 | 3 | 3 | 3 | 3 | 3 | 3 | 3 |
| Plasticizer 8 | 0.5 | 0.5 | 0.5 | 0.5 | 0.5 | 0.5 | 0.5 | 0.5 |
| SF69 | 0.05 | 0.05 | 0.05 | 0.05 | 0.05 | 0.05 | 0.05 | 0.05 |
| Silwet L 7622 | 0.1 | 0.1 | 0.1 | 0.1 | 0.1 | 0.1 | 0.1 | 0.1 |
| Tergitol 15-S-3 | | | | | | | 0.5 | |
| Ecosurf SA-4 | | | | | | | | 0.5 |
| Aerosol LF-4 | | 0.5 | | | | | | |
| Aerosol WA-300 | | | 0.5 | | | | | |

TABLE 10b-continued

| Component | Comparative Example J | 104-10 | 104-11 | 104-12 | 104-13 | 104-14 | 104-15 | 104.17 |
|---|---|---|---|---|---|---|---|---|
| Aerosol OT-70 PG | | | | 0.5 | | | | |
| EFKA 4340 | | | | | 0.5 | | | |
| Edaplan LA 412 | | | | | | 0.5 | | |
| Valifast Black 3808 | 3.25 | 3.25 | 3.25 | 3.25 | 3.25 | 3.25 | 3.25 | 3.25 |
| Valifast Orange 3210 | 0.75 | 0.75 | 0.75 | 0.75 | 0.75 | 0.75 | 0.75 | 0.75 |
| total | 100.0 | 100.0 | 100.0 | 100.0 | 100.0 | 100.0 | 100.0 | 100.0 |
| DRY TIME | <2 sec | <2 sec | <2 sec | <2 sec | <2 sec | <2 sec | <2 sec | <2 sec |
| DECAP TIME | 20 sec | >90 sec | 60 sec | 60 sec | 50 sec | 70 sec | 60 sec | 50 sec |

The printed images were found to have a drying time of 2 seconds or less on non-porous surfaces. The images had excellent rub resistance and adhesion properties. Comparative Example I did not contain any amine alkylbenzene sulfonates, alcohol ethoxylates, ethoxylated and propoxylated C6-C12 alcohols, polyoxoalkylenes, modified polysiloxanes, polyether-modified polysiloxanes, polyglycol esters, modified sulfosuccinates, unmodified sulfosuccinates, or acrylic block copolymers. The additives in the Examples were found to provide decap times of at least 30 seconds, which was longer than Comparative Example I Example 11

This example illustrates embodiments of the thermal ink jet ink composition of the invention. The materials employed in preparing the thermal ink jet ink composition, their amounts, and the formulation numbers are set forth in Table 11 below.

TABLE 11

| Component | 104-15 | 104-16 | 104-17 | 104-18 | 104-19 | 104-20 | 104-21 | 104-22 | 104-23 | 104-24 | 104-25 | 104-26 |
|---|---|---|---|---|---|---|---|---|---|---|---|---|
| MEK | 75.85 | 75.85 | 75.85 | 75.85 | 75.85 | 75.85 | 75.85 | 75.85 | 75.85 | 75.85 | 75.85 | 75.85 |
| Propasol P | 10 | 10 | 10 | 10 | 10 | 10 | 10 | 10 | 10 | 10 | 10 | 10 |
| diacetone alcohol | 6 | 6 | 6 | 6 | 6 | 6 | 6 | 6 | 6 | 6 | 6 | 6 |
| SuperEster A-75 | 3 | 3 | 3 | 3 | 3 | 3 | 3 | 3 | 3 | 3 | 3 | 3 |
| Plasticizer 8 | 0.5 | 0.5 | 0.5 | 0.5 | 0.5 | 0.5 | 0.5 | 0.5 | 0.5 | 0.5 | 0.5 | 0.5 |
| SF69 | 0.05 | 0.05 | 0.05 | 0.05 | 0.05 | 0.05 | 0.05 | 0.05 | 0.05 | 0.05 | 0.05 | 0.05 |
| Silwet L 7622 | 0.1 | 0.1 | 0.1 | 0.1 | 0.1 | 0.1 | 0.1 | 0.1 | 0.1 | 0.1 | 0.1 | 0.1 |
| Ethopropmeen T/28 | 0.5 | | | | | | | | | | | |
| Troysol S366 | | 0.5 | | | | | | | | | | |
| Carbowet GA221 | | | 0.5 | | | | | | | | | |
| Surfynol 104E | | | | 0.5 | | | | | | | | |
| Ecosurf SA-4 | | | | | 0.5 | | | | | | | |
| Tergitol T-3 | | | | | | 0.5 | | | | | | |
| Triton X-15 | | | | | | | 0.5 | | | | | |
| Stepan MWA-391 | | | | | | | | 0.5 | | | | |
| Capstone 1475 | | | | | | | | | 0.5 | | | |
| Hydrapol RP | | | | | | | | | | 0.5 | | |
| FluorN 489 | | | | | | | | | | | 0.5 | |
| Chemguard S-554-100 | | | | | | | | | | | | 0.5 |
| Valifast Black 3808 | 3.25 | 3.25 | 3.25 | 3.25 | 3.25 | 3.25 | 3.25 | 3.25 | 3.25 | 3.25 | 3.25 | 3.25 |
| Valifast Orange 3210 | 0.75 | 0.75 | 0.75 | 0.75 | 0.75 | 0.75 | 0.75 | 0.75 | 0.75 | 0.75 | 0.75 | 0.75 |
| Total | 100.0 | 100.0 | 100.0 | 100.0 | 100.0 | 100.0 | 100.0 | 100.0 | 100.0 | 100.0 | 100.0 | 100.0 |

From the Examples above, it can be seen the various additives may be used in the thermal ink jet ink compositions disclosed herein to extend the decap times in a thermal ink jet printer.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A thermal ink jet ink composition comprising:
   a volatile organic solvent;
   a binder resin, wherein the binder resin is present in an amount from 0.3% to 8% by weight of the ink composition;
   a dye;
   a humectant in an amount from 1% to 40% by weight of the ink composition, and
   an additive for extending the decap time of the ink composition, wherein the additive is present in an amount less than 0.1% by weight of the ink composition, wherein the additive is selected from the group consisting of perfluoropolyethers, modified perfluoropolyethers, glycol-based perfluoroalkyl ethers, perfluoroalkyl substituted polyethers, and mixtures thereof,
   and wherein if water is present, it is present in amount less than 10% by weight of the ink composition;
   wherein the ink composition has a decap time of greater than 15 seconds in a thermal ink jet printer.

2. The thermal ink jet ink composition of claim 1, wherein the ink composition has a decap time of greater than 1 minute in a thermal ink jet printer.

3. The thermal ink jet ink composition of claim 1, wherein the ink composition has a dry time of less than 5 seconds on a nonporous substrate when printed in a thermal ink jet printer.

4. A thermal ink jet cartridge including the thermal ink jet ink composition of claim 1.

5. The thermal ink jet ink composition of claim 1, wherein the one or more volatile organic solvents are selected from the group consisting of methanol, ethanol, 1-propanol, isopropanol, acetone, methyl ethyl ketone, methyl propyl ketone, methyl i-propyl ketone, 3-pentanone, cyclohexanone, methyl acetate, ethyl acetate, and mixtures thereof.

6. The thermal ink jet ink composition of claim 1, wherein the binder resin is selected from the group consisting of polyamide resins, rosin ester resins, acrylic resins, polyketone resins, cellulose nitrate resins, polyvinyl butyral resins, vinyl resins, polyhydroxystyrene resins, sulfonamide-modified epoxy resins, and mixtures thereof.

7. The thermal ink jet ink composition of claim 1, wherein the humectant is selected from the group consisting of polyol, glycol ether, diacetone alcohol, 2-pyrrolidinone, N-methylpyrrolidone, ethyl lactate, 1,3-dimethyl-2-imidazolidindione, propylene carbonate, alkyl esters, and mixtures thereof.

8. A thermal ink jet ink composition comprising:
   a volatile organic solvent;
   a binder resin, wherein the binder resin is present in an amount from 0.3% to 8% by weight of the ink composition;
   a dye;
   a humectant in an amount from 1% to 40% by weight of the ink composition, and
   an ionic surfactant additive for extending the decap time of the ink composition, wherein the additive is present in an amount greater than 0.1% by weight of the ink composition, wherein the additive is selected from the group consisting of unmodified sulfosuccinates, monoester sulfosuccinates, diester sulfosuccinates, modified sulfosuccinates, amine alkylbenzene sulfonates, alkoylated tallow amines, and mixtures thereof,
   and wherein if water is present, it is present in amount less than 10% by weight of the ink composition;
   wherein the ink composition has a decap time of greater than 15 seconds in a thermal ink jet printer.

9. The thermal ink jet ink composition of claim 8, wherein the ink composition has a decap time of greater than 1 minute in a thermal ink jet printer.

10. The thermal ink jet ink composition of claim 8, wherein the ink composition has a dry time of less than 5 seconds on a nonporous substrate when printed in a thermal ink jet printer.

11. A thermal ink jet cartridge including the thermal ink jet ink composition of claim 8.

12. The thermal ink jet ink composition of claim 8, wherein the one or more volatile organic solvents are selected from the group consisting of methanol, ethanol, 1-propanol, isopropanol, acetone, methyl ethyl ketone, methyl propyl ketone, methyl i-propyl ketone, 3-pentanone, cyclohexanone, methyl acetate, ethyl acetate, and mixtures thereof.

13. The thermal ink jet ink composition of claim 8, wherein the binder resin is selected from the group consisting of polyamide resins, rosin ester resins, acrylic resins, polyketone resins, cellulose nitrate resins, polyvinyl butyral resins, vinyl resins, polyhydroxystyrene resins, sulfonamide-modified epoxy resins, and mixtures thereof.

14. The thermal ink jet ink composition of claim 8, wherein the humectant is selected from the group consisting of polyol, glycol ether, diacetone alcohol, 2-pyrrolidinone, N-methylpyrrolidone, ethyl lactate, 1,3-dimethyl-2-imidazolidindione, propylene carbonate, alkyl esters, and mixtures thereof.

15. A thermal ink jet ink composition comprising:
    a volatile organic solvent;
    a binder resin, wherein the binder resin is present in an amount from 0.3% to 8% by weight of the ink composition;
    a dye;
    a humectant in an amount from 1% to 40% by weight of the ink composition, and
    a nonionic surfactant additive for extending the decap time of the ink composition, wherein the additive is present in an amount greater than 0.1% by weight of the ink composition, wherein the additive is selected from the group consisting of nonylphenol ethoxylate phosphates, polyglycol esters, phosphate esters of an akylphenoxy polyethoxyethanol, alcohol ethoxylates, polyoxoalkylenes, acrylic block copolymers, and mixtures thereof,
    and wherein if water is present, it is present in amount less than 10% by weight of the ink composition;
    wherein the ink composition has a decap time of greater than 15 seconds in a thermal ink jet printer.

16. The thermal ink jet ink composition of claim 15, wherein the ink composition has a decap time of greater than 1 minute in a thermal ink jet printer.

17. The thermal ink jet ink composition of claim 15, wherein the ink composition has a dry time of less than 5 seconds on a nonporous substrate when printed in a thermal ink jet printer.

18. A thermal ink jet cartridge including the thermal ink jet ink composition of claim 15.

19. The thermal ink jet ink composition of claim 15, wherein the one or more volatile organic solvents are selected from the group consisting of methanol, ethanol, 1-propanol, isopropanol, acetone, methyl ethyl ketone, methyl propyl ketone, methyl i-propyl ketone, 3-pentanone, cyclohexanone, methyl acetate, ethyl acetate, and mixtures thereof.

20. The thermal ink jet ink composition of claim 15, wherein the binder resin is selected from the group consisting of polyamide resins, rosin ester resins, acrylic resins, polyketone resins, cellulose nitrate resins, polyvinyl butyral resins, vinyl resins, polyhydroxystyrene resins, sulfonamide-modified epoxy resins, and mixtures thereof.

21. The thermal ink jet ink composition of claim 15, wherein the humectant is selected from the group consisting of polyol, glycol ether, diacetone alcohol, 2-pyrrolidinone, N-methylpyrrolidone, ethyl lactate, 1,3-dimethyl-2-imidazolidindione, propylene carbonate, alkyl esters, and mixtures thereof.

22. The thermal ink jet ink composition of claim 1 wherein the additive is selected from perfluoropolyethers, modified perfluoropolyethers, and mixtures thereof.

* * * * *